United States Patent
Bhardwaj et al.

(10) Patent No.: US 7,143,266 B1
(45) Date of Patent: Nov. 28, 2006

(54) STORING IMMEDIATE DATA OF IMMEDIATE INSTRUCTIONS IN A DATA TABLE

(75) Inventors: Manish Bhardwaj, Singapore (SG); Dexter Chin, Singapore (SG)

(73) Assignee: Infineon Technologies Asia Pacific, Pte Ltd, Singapore (SG)

(*) Notice: Subject to any disclaimer, the term of this patent is extended or adjusted under 35 U.S.C. 154(b) by 0 days.

(21) Appl. No.: 09/979,572

(22) PCT Filed: May 17, 1999

(86) PCT No.: PCT/SG99/00043

§ 371 (c)(1),
(2), (4) Date: Apr. 1, 2002

(87) PCT Pub. No.: WO00/70526

PCT Pub. Date: Nov. 23, 2000

(51) Int. Cl.
*G06F 9/30* (2006.01)

(52) U.S. Cl. .................................................. 712/201

(58) Field of Classification Search ................ 712/201, 712/210
See application file for complete search history.

(56) References Cited

U.S. PATENT DOCUMENTS 4,516,203 A * 5/1985 Farber et al. ............... 711/3
5,761,105 A * 6/1998 Goddard et al. ............ 708/510

OTHER PUBLICATIONS

Vanek, Leonard I. and Culp, Mark N. "Static Analysis of Program Source Code using EDSA". © Oct. 1989. pp. 192-199.*
Allen, F.E. and Cocke, J. "A Program data Flow Analysis Procedure". © 1976. pp. 137-147.*
Fosdick, Lloyd D. and Osterweil, Leon J. "Data Flow Analysis In Software Reliability". © 1976. pp. 305-330.*
Free On-Line Dictionary of Computing (FOLDOC). http://foldoc.org/ search terms: data flow analysis, table, record, static analysis.*

* cited by examiner

*Primary Examiner*—Richard L. Ellis
*Assistant Examiner*—Aimee Li
(74) *Attorney, Agent, or Firm*—Horizon IP Pte Ltd

(57) ABSTRACT

An efficient coding scheme is disclosed. The coding provides for the separation of immediate data from the instruction stream. A static flow analysis determines the immediate data in the program and assigns it a location for storage in a data table. The flow analysis also generates information directing the processor to the location of the immediate data in the data-order table. When an immediate instruction is encountered during execution, the processor retrieves the immediate data from the data-order table.

8 Claims, 13 Drawing Sheets

STORING IMMEDIATE DATA OF IMMEDIATE INSTRUCTIONS IN A DATA TABLE

FIELD OF THE INVENTION

The invention generally relates to processors and, more particularly, to improving coding efficiency in processors.

BACKGROUND OF THE INVENTION

In general, a digital computer performs tasks defined by a list of internally stored instructions. The list of instructions or computer codes, which is referred to as a program, is stored in the computer's main memory. To perform a given computational task, the central processing unit or processor of the digital computer fetches individual instructions of the program for execution. A program counter within the computer points to the next instruction to be executed.

The length of the instruction or instruction word depends on the specific computer design. FIG. 1 shows a typical instruction word 101. The instruction word includes an opcode field 110 and one or more operand fields 115, depending on the instruction. The opcode defines the operation and the operand or operands may contain data that are to be operated by the given instruction.

Various types of computer architectures exist, such as Von-Neumann and the Harvard Architectures. See generally Hennessy and Pallerson, *Computer Architecture: A Quantitative Approach* (1996), which is herein incorporated by reference for all purposes. In the Von-Neumann Architecture, both data and instructions are transmitted between the processor and memory by a bi-directional bus. As such, the instruction stream includes both data and instructions. In contrast, instructions and data are transmitted on separate buses in the Harvard Architecture, separating the data from the instruction stream.

An instruction requiring an operand that is a constant known at compile time is referred to as an immediate instruction. The known operand is referred to as an immediate data. Immediate data often results in situations where an instruction is operating on a constant or where the operand is an address pointer.

In all current processors, regardless of the architecture, immediate data is included as part of the instruction word (stored in the operand field 115 of the instruction word). That is, the immediate data is part of the instruction stream. In some instances, the length of the immediate data can exceed the length of the operand field of the instruction word. Immediate data which exceeds the length of the operand field is typically referred to as a long immediate data. To accommodate the long immediate data, an extension 220 is provided in the instruction word 101, as shown in FIG. 2. The instruction extension is essentially an instruction word containing the immediate data that follows the instruction word 101. As such, an additional cycle is required to handle the extension of a long immediate data.

The presence of extensions can complicate decoding and pipelining issues. To avoid extensions, either constraints are imposed to limit the length of immediate data or the instruction word comprises an operand field having a sufficient length to handle the widest possible immediate data. In the first case, imposing constraints on the length of immediate data may not be desirable due to application requirements. For example, in digital signal processing (DSP) applications, the length of the immediate data is often governed by domain characteristics such as signal-to-noise (SNR) requirements. Likewise, increasing the length of the instruction word to handle the long immediate data may be undesirable as this leads to inefficient use of memory, particularly with embedded systems where chip size is a major concern.

As evidenced by the foregoing discussion, it is desirable to improve coding efficiency without imposing constraints on the length immediate data.

SUMMARY OF THE INVENTION

In one embodiment, the processor includes a program counter which stores an instruction address. The instruction at the instruction address is fetched by the processor and decoded. If the decoded instruction comprises an immediate instruction, the corresponding immediate data is fetched from a data table.

In one embodiment, immediate data is stored in the data table in the order determined by a flow analysis. The flow analysis identifies immediate instructions and stores the corresponding immediate data in the program order of the immediate instructions. In one embodiment, the flow analysis identifies immediate instructions and stores the corresponding immediate data in substantially the program order of the immediate instructions, taking branching into account. The information provided by the flow analysis is used to generate instruction coding to enable retrieval of the immediate data from the data table.

DESCRIPTION OF THE INVENTION

The present invention relates generally to a coding scheme for handling immediate data in a computer program, which makes efficient use of memory without imposing programming constraints. A processor, such as a microprocessor, a microcontroller, a digital signal processor (DSP), or an embedded system, executes the program. The present invention is particularly useful for handling immediate data in the processor's firmware.

The computer program can be generated using high-level computer languages, such as C++. Other high level languages are also useful. The program is processed to translate it into machine code usable by the processor. The program may be processed in several stages before it is finally translated into machine code. For example, most compilers initially process the program to generate assembly code. An assembler then translates the code into machine code which is then stored into memory for use by the processor.

In accordance with the invention, a coding scheme that separates immediate data from the instruction stream is disclosed. As used herein, the term "immediate data" can refer to long immediate data or immediate data in general. Such a coding scheme eliminates instruction extensions without increasing the length of the instruction word or imposing constraints on programming, thus improving coding density and processing efficiency.

In one embodiment, the separation of immediate data from the instruction stream is facilitated by a static control flow analysis to identify and determine an order of the immediate data in the program. Immediate data are stored in a data table in the order determined by the flow analysis. The coding of an immediate instruction can include addressing information for retrieval of the immediate data by the processor when the immediate instruction is executed.

A post-processor, for example, performs the flow analysis. The post-processor can be incorporated as a part of a compiler, an assembler, or a tool used to translate higher level codes into lower or machine level codes. Providing a post-processor which is separate from the tools used to translate higher level codes into lower level codes is also useful.

Figure 1:
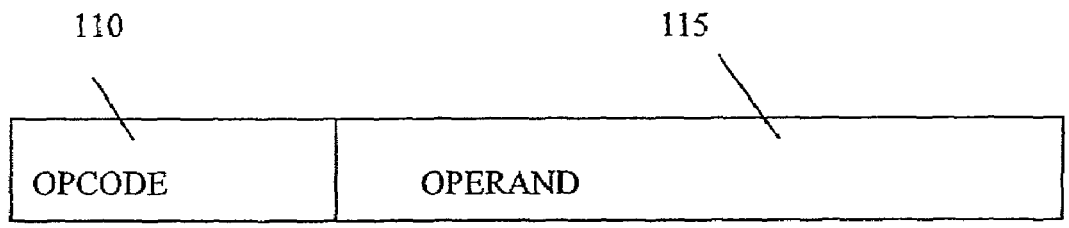
FIG. 1 shows an instruction word.
Figure 2:
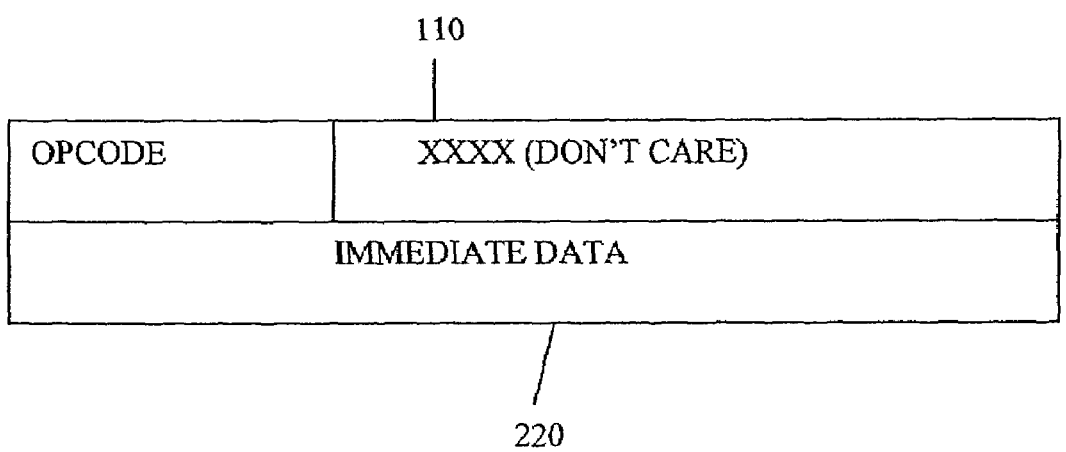
FIG. 2 shows an immediate instruction word which includes an instruction extension.
Figure 3:
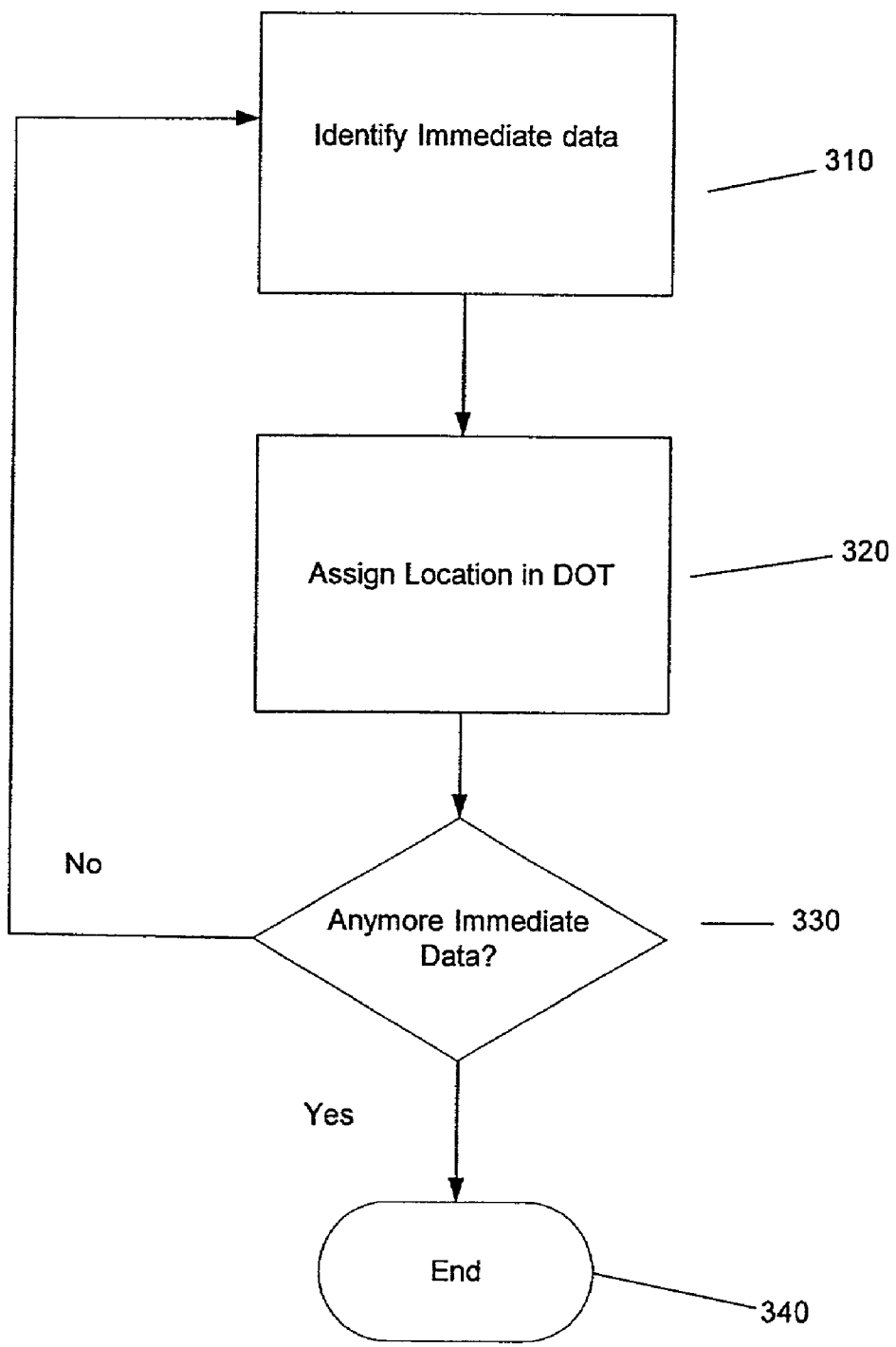
FIG. 3 shows a static flow analysis in accordance with one embodiment of the invention.

FIG. 3 shows a flow analysis in accordance with one embodiment of the invention. The flow analysis facilitates the separation of immediate data from the instruction stream. The flow analysis, for example, creates a model of a data table comprising immediate data of the immediate instructions from a program.

In one embodiment, the flow analysis identifies an immediate instruction in the program at step 310. At step 320, the immediate data of the immediate instruction is assigned a location in a separate storage that is accessible by the processor. The assignment of location can be explicit (e.g., assigning a specific location) or implicit (e.g., by placement of immediate data in the model). The separate storage, for example, comprises a read only memory (ROM) table or other memory storage locations. The separate storage is referred to as a data table (DT). The flow analysis also generates addressing information to enable retrieval of the immediate data when the processor executes the instruction. At step 330, the flow analysis continues the process of identifying immediate data and assigning a location in the DT until all immediate data in the program are identified. At step 340, the flow analysis is completed once all immediate data have been identified.

The information generated by the flow analysis, such as the model of the DT, is used to replicate the actual DT. For example, the flow analysis provides the information that enables the storing or burning (for ROM) of the immediate data into the DT at their assigned addresses during chip design or fabrication. The flow analysis can also provide the function of creating the DT.

The information provided by the flow analysis can also be used to generate the instruction coding to retrieve the immediate data from the DT. The post-processor that performs the flow analysis can provide the function of generating the instruction coding. A separate post-processor that provides the instruction coding can also be useful. In a preferred embodiment, the flow analysis identifies the immediate data in their program execution order (program order) and assigns DT addresses to the immediate data to reflect their program order. In one embodiment, the flow analysis provides a systematic approach to identify immediate data in substantially their program order, taking into account of branches, i.e., conditionally executed instructions.

Figure 4:
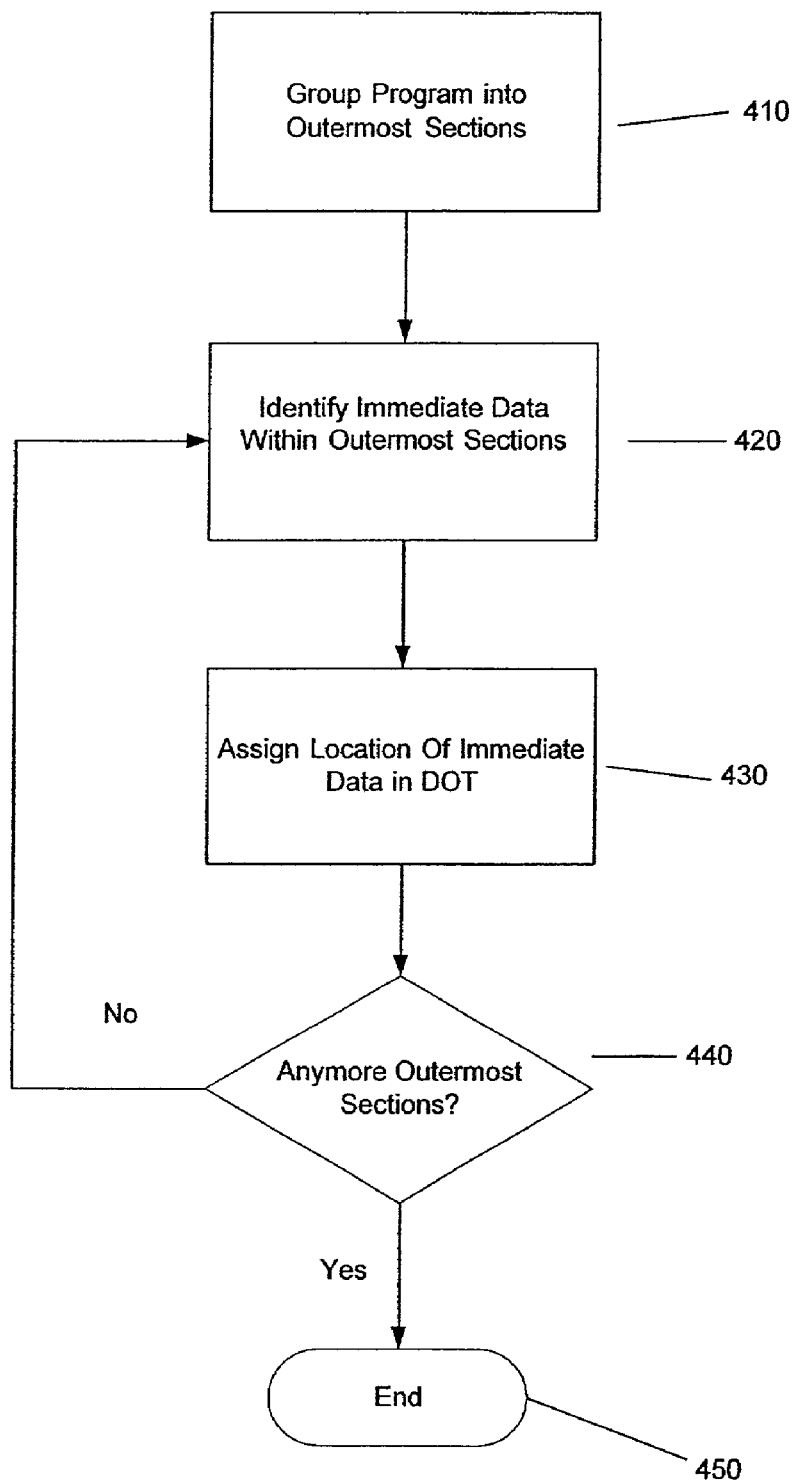
FIG. 4 shows a static flow analysis in accordance with another embodiment of the invention.

FIG. 4 shows another embodiment of the static flow analysis. As shown, the flow analysis commences at step 410 by grouping the program codes into outermost sections. At step 420, the flow analysis identifies immediate data within an outermost section and assigns corresponding locations in the DT at step 430. The flow analysis also generates addressing information to enable retrieval of the immediate data when the processor executes the instruction. At step 440, the flow analysis determines whether there are more outermost sections that need to be analyzed. If there are more outermost sections that need to be analyzed, the flow analysis returns to step 420. Otherwise, the flow analysis finishes at step 450.

To understand the concept of outermost sections, the term section is first defined. A typical program comprises a plurality of codes and branches. A section refers to an atomic unit of the program and is defined as one or more instructions or codes in a program path between two branch nodes or points. A branch node or point can refer to either the start or the end of a branch. An unconditional section refers to a section whose codes are all unconditionally executed during program execution. On the other hand, a section whose codes may not be executed during program execution is referred to as a conditional section.

An outermost section is defined as either an unconditional section or a group of conditional sections between corresponding start and end branch nodes that are unconditionally encountered during program execution. An outermost section that comprises an unconditional section is referred to as an unconditional outermost section. An outermost section that comprises a group of conditional sections is referred to as a conditional outermost section. From the definitions provided, a conditional outermost section comprises at least two conditional sections. In some instances, a conditional outermost section can comprise a plurality of conditional sections having numerous branches therein.

Figure 5:
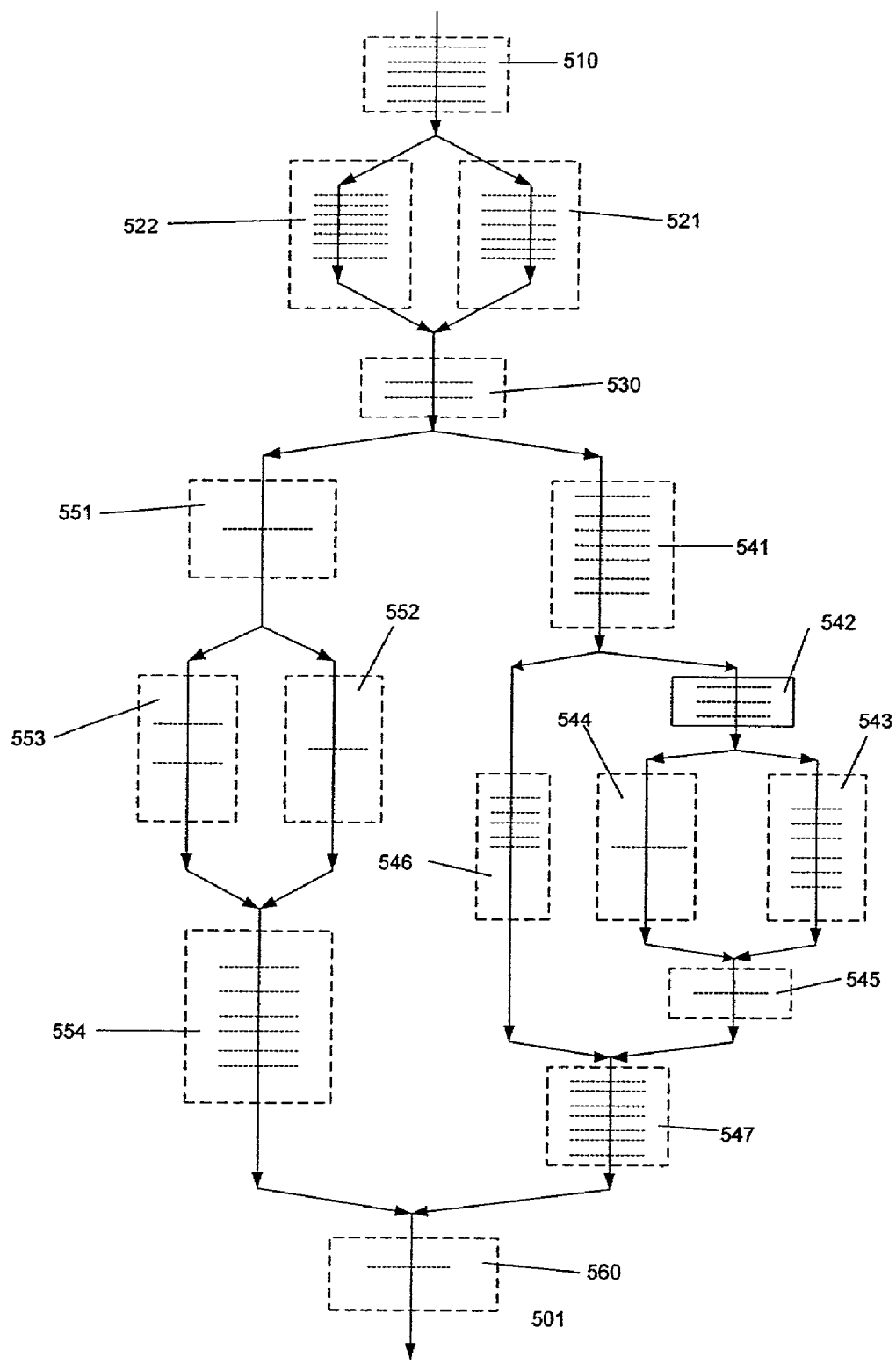
FIGS. 5–6 illustrate the concept of outermost sections in accordance with the invention.
Figure 6:
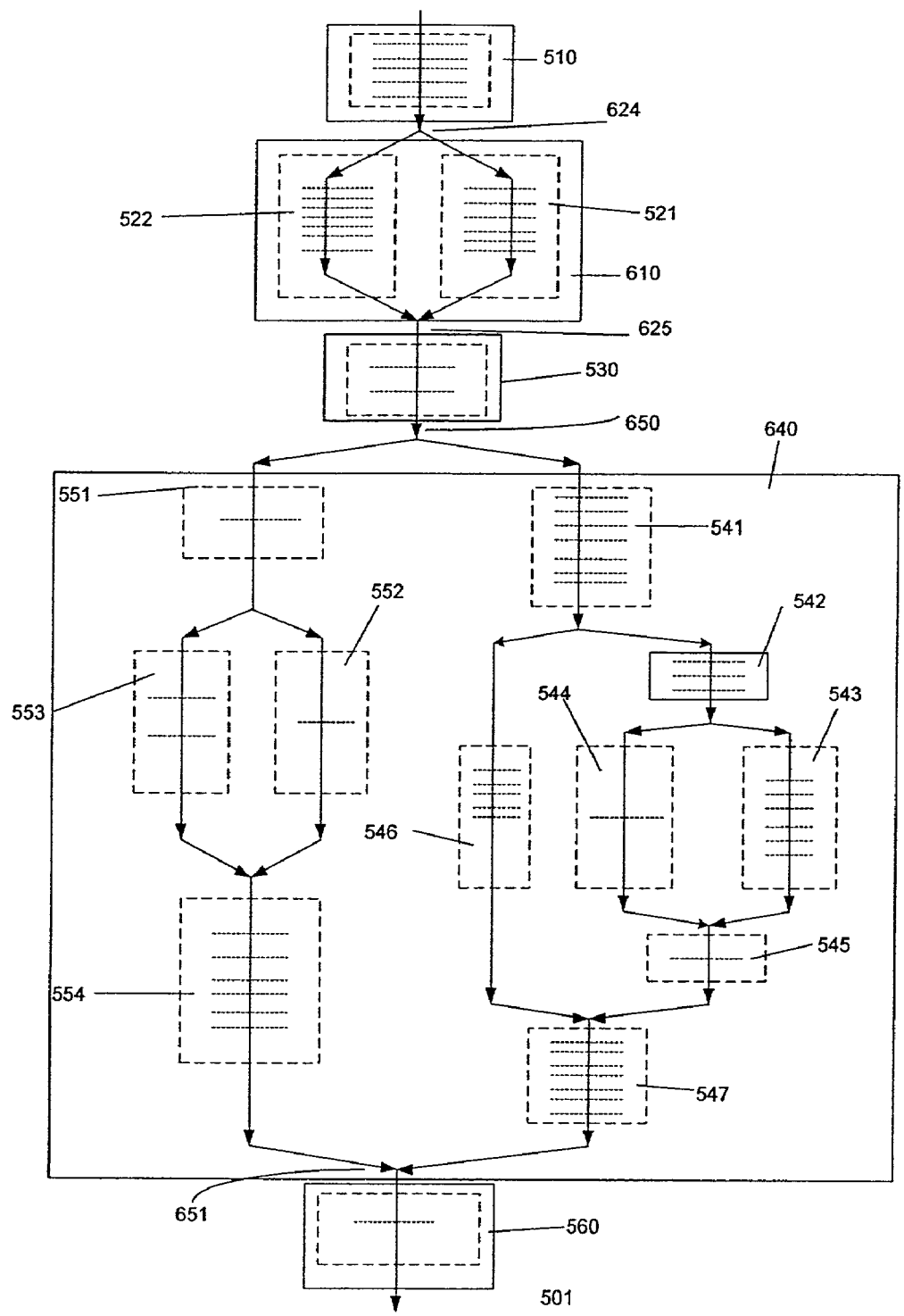

FIGS. 5–6 show a sample program 501 to facilitate understanding of the static flow analysis in accordance with one embodiment of the invention. Referring to FIG. 5, the program includes a plurality of codes and branches. A start of a branch is represented with arrows splitting off into two different paths of the program, and an end of a branch is represented with arrows merging into one path. The codes are grouped into sections 510, 521, 522, 530, 541–547, 551–554, and 560. A dashed line within a section represents an immediate instruction.

Referring to FIG. 6, the program 501 is grouped into outermost sections. Applying the rules pertaining to outermost sections, sections 510, 530, and 560 are categorized as outermost sections since they are unconditional sections. Sections 521 and 522 are grouped as an outermost section 610 because they are located between corresponding unconditional start and end branch points 624 and 625. Likewise, conditional sections 541–547 and 551–554 are grouped as an outermost section 640 since those conditional sections are located between corresponding unconditional start and end branch points 650 and 651.

In an embodiment of the invention, the static flow analysis identifies immediate data within an outermost section one outermost section at a time. In a preferred embodiment, the flow analysis identifies immediate data from the outermost sections in the program order of the outermost sections. The immediate data are assigned DT addresses to reflect the outermost sections' program order. More preferably, immediate data within an outermost section are identified in their program order and assigned DT addresses to reflect their program order within the outermost section. Analyzing outermost sections in other orders and assigning addresses to reflect other orders can also be useful.

Figure 7:
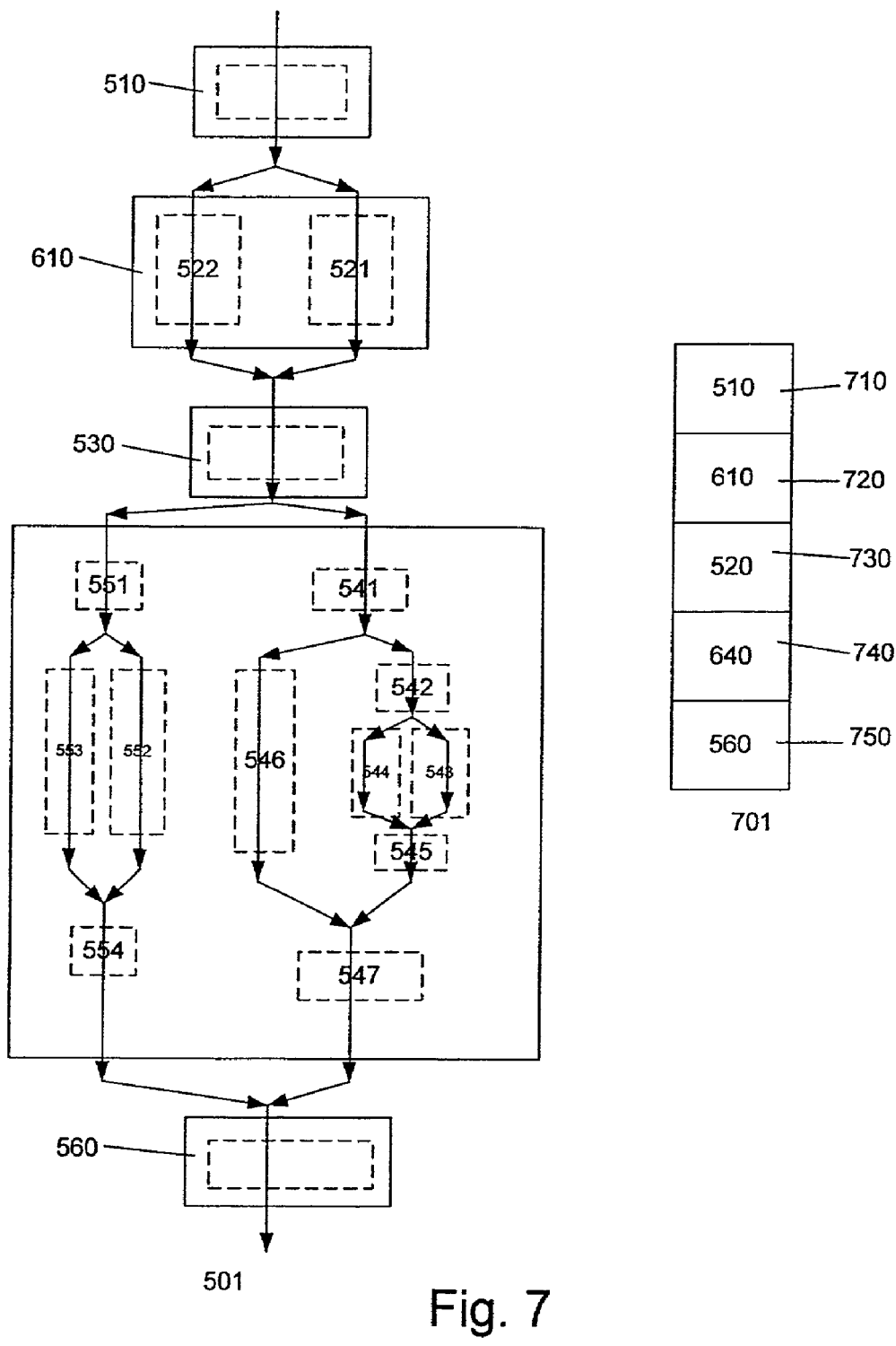
FIG. 7 shows the placement of immediate data from the program into a DT in accordance with one embodiment of the invention.

FIG. 7 illustrates the placement of immediate data from the program 501 into a DT table 701 in accordance with one embodiment of the invention. As shown, the program is grouped into outermost sections. The program order of the outermost sections is 510, 610, 530, 640, 560. Since outermost section 510 is first in the program order, the immediate data corresponding to the immediate instructions therein are assigned and stored in addresses of the first region 710 of the DT. Subsequent outermost sections 610, 530, 640, and 560 occupy subsequent regions 720, 730, 740, and 750, respectively, of the DT.

As previously described, an unconditional outermost section comprises more than one conditional sections. In one embodiment of the invention, the flow analysis handles a conditional outermost section by separating it into right and left subsections. One subsection is analyzed first before analyzing the other. In one embodiment, the flow analysis analyzes the right subsection first and then the left subsection. Immediate data in the right subsection are identified and assigned DT addresses first and then immediate data in the left subsection are identified and assigned DT addresses. The DT addresses preferably reflect the program order of the immediate data within the subsection. Analyzing the left subsection first and then the right subsection is also useful. In a preferred embodiment, the order in which the subsection is analyzed is consistent for all the outermost sections.

A subsection of an outermost section can comprise a plurality of conditional sections. In such a case, the subsection can be grouped into outermost sections as viewed within the subsection. The immediate data within an outermost section preferably are identified and assigned DT addresses to reflect their program order within the outermost sections, as previously described. In this manner, the program is recursively analyzed to construct the DT. Thus, the immediate data are analyzed and assigned DT addresses to reflect substantially their program order, taking branching into account.

Figure 8:
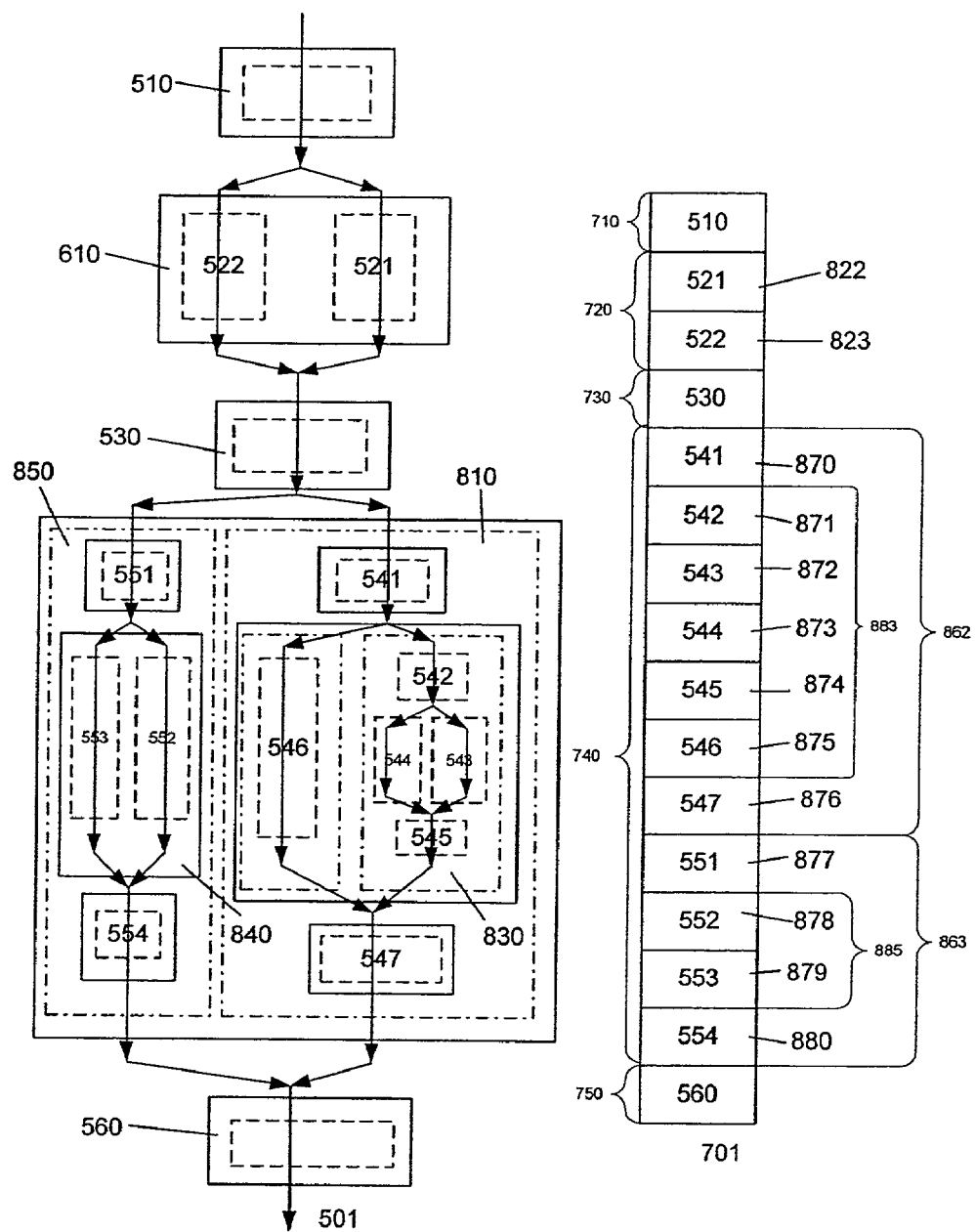
FIG. 8 illustrates a flow analysis in accordance with another embodiment of the invention.

FIG. 8 illustrates the recursive construction of DT by the flow analysis. Similar to FIG. 7, the program 501 comprises outermost sections having a program order of 510, 610, 530, 640, and 560. The immediate data of the outermost sections are assigned DT addresses to reflect the program order of the outermost sections. Immediate data from outermost sections 510, 610, 530, 640, and 560 are assigned addresses in DT regions 710, 720, 730, 740, and 750, respectively.

Outermost section 610, which comprises sections 521 and 522, is separated into right and left subsections. Sections 521 and 522 can be viewed as outermost sections within their respective subsections (i.e., they unconditional sections within their respective subsections). In accordance with one embodiment, the right section is analyzed before the left section, resulting in the storing of immediate data from the right subsection in portion 822 of DT region 720 and the storing of immediate data from the left subsection in portion 823.

Outermost section 640 is also separated into right and left subsections 810 and 850 and their immediate data are stored in portions 862 and 863, respectively, of the DT region 740.

The right subsection comprises a plurality of sections which can be grouped into outermost sections with respect to the subsection. Sections 541 and 547 are outermost sections since they are considered unconditional sections; sections 542–546 are grouped as an outermost section 830 since they are located between corresponding unconditional start and end branch points 821 and 822. Immediate data from outermost sections 541, 830, and 547 of the right subsection are stored in portions 870, 883, and 876 of DT region 740.

Outermost section 830 can be further separated into right and left subsections. As such, the analysis is recursively applied to the program code to group the code into outermost sections and separate them into right and left subsections. The recursive analysis, in accordance with one embodiment of the invention, results in assigning DT addresses for the immediate data from sections 542, 543, 544, 545, and 546 in subportions 871, 872, 873, 874, and 875 of the portion 883.

After immediate data from the right subsection 810 have been assigned DT addresses, the left subsection 850 is analyzed. The analysis, which is similar to that of the right subsection, groups the codes into outermost sections 551, 840, and 554. The immediate data from the outermost sections are assigned DT addresses in portion 863 of DT region 740 to reflect their program order. In particular, immediate data from outermost section 551 are stored in portion 877, immediate data from outermost section 840 are stored in portion 885, and immediate data from outermost section 554 are stored in portion 880. Outermost section 840 can be separated into right and left subsections. The right subsection comprises section 552 and the left subsection comprises section 553. Immediate data from the right subsection are stored in subportion 878 and immediate data from the left subsection are stored in subportion 879.

In one embodiment, a subroutine Build_DT recursively analyzes the program and creates a model of a DT with its contents. The information produced by the Build_DT routine can be, for example, provided to another tool to create the DT. An example of the subroutine Build_DT is as follows:

Build_DT(section, total_outermost_sections)
for i=0 . . . total_outermost_sections−1)
Place (outersection(i));
endfor
end Build_DT As shown, Build_DT routine receives parameters section and total_outermost_sections. The section parameter represents the section to be placed (which is initially the whole program), and the total_outermost_sections parameter represents the number of outermost sections within the program. The routine analyzes the outermost sections in the program order of the outermost sections, starting from the first one (i=0) to the last one (total_outermost_section−1). For each outermost section, Build_DT calls a routine Place to store the immediate data into the DT. In one embodiment, Place stores the immediate data into the DT in their program order within the outermost section.

An example of the Place subroutine is as follows:
Place (section)
if section is unconditional
place all the immediates required by routine
in their data order in the DT.

```
else
    Build_DT(section.right,
        get_outermost(section.right))
    Build_DT(section.left,
        get_outermost(section.left))
    endif
end Place
```

The subroutine Place analyzes the outermost section to determine whether it is a conditional or an unconditional outermost section. An unconditional outermost section indicates that it contains one section. If an unconditional outermost section is detected, the routine stores the section's immediate data in the DT. The immediate data are stored in their program order or in the order in which they are identified. Once all immediate data within the outermost section are stored in the DT, the Place routine terminates and returns to the Build_DT routine to continue analyzing the next outermost section, if any.

A conditional outermost section, on the other hand, indicates that there exists a plurality of sections. When a conditional outermost section is encountered, the Place routine separates the outermost section into right and left subsections and analyzes each one individually. Illustratively, the Place routine analyzes the right subsection and then the left subsection.

The Place routine calls the Build_DT routine to analyze the subsection. Simultaneously, a routine get_outermost is invoked to find the outermost sections within the subsection. As such, Place views each subsection as if it were a separate program and analyzes accordingly. In this manner, the post-processor recursively analyzes the program to construct the DT model.

The flow analysis also provides information to generate the instruction coding for handling the separation of immediate data from the instruction stream. In accordance with the invention, the flow analysis provides addressing information related to the immediate data in the DT. Such addressing information can be in the form of relative or absolute addressing information. For relative addressing, the flow analysis may perform more than one pass to obtain the addressing information. As an example, a first pass may be used to compute the sections and subsections while a second pass is used to assign the offset for relative addressing of the immediate data.

The addressing information generated by the flow analysis can be used by, for example, a compiler or an assembler to generate the instruction coding to accommodate the use of a DT. In one embodiment, the instruction coding informs the processor that the current instruction needs an immediate data as well as addressing information to retrieve the immediate data. Indicating that an immediate data is needed can be achieved by, for example, providing a bit in the instruction to serve as a flag to indicate that an immediate data is needed. Alternatively, the processor could be informed implicitly by embedding the request for immediate data in the opcode. The addressing information identifying the location of the immediate data can be stored in the operand field of the instruction word. The information is transferred to and used by the DT pointer to access the DT for retrieving the immediate data. In one embodiment, the addressing information contains absolute addressing.

Figure 9:
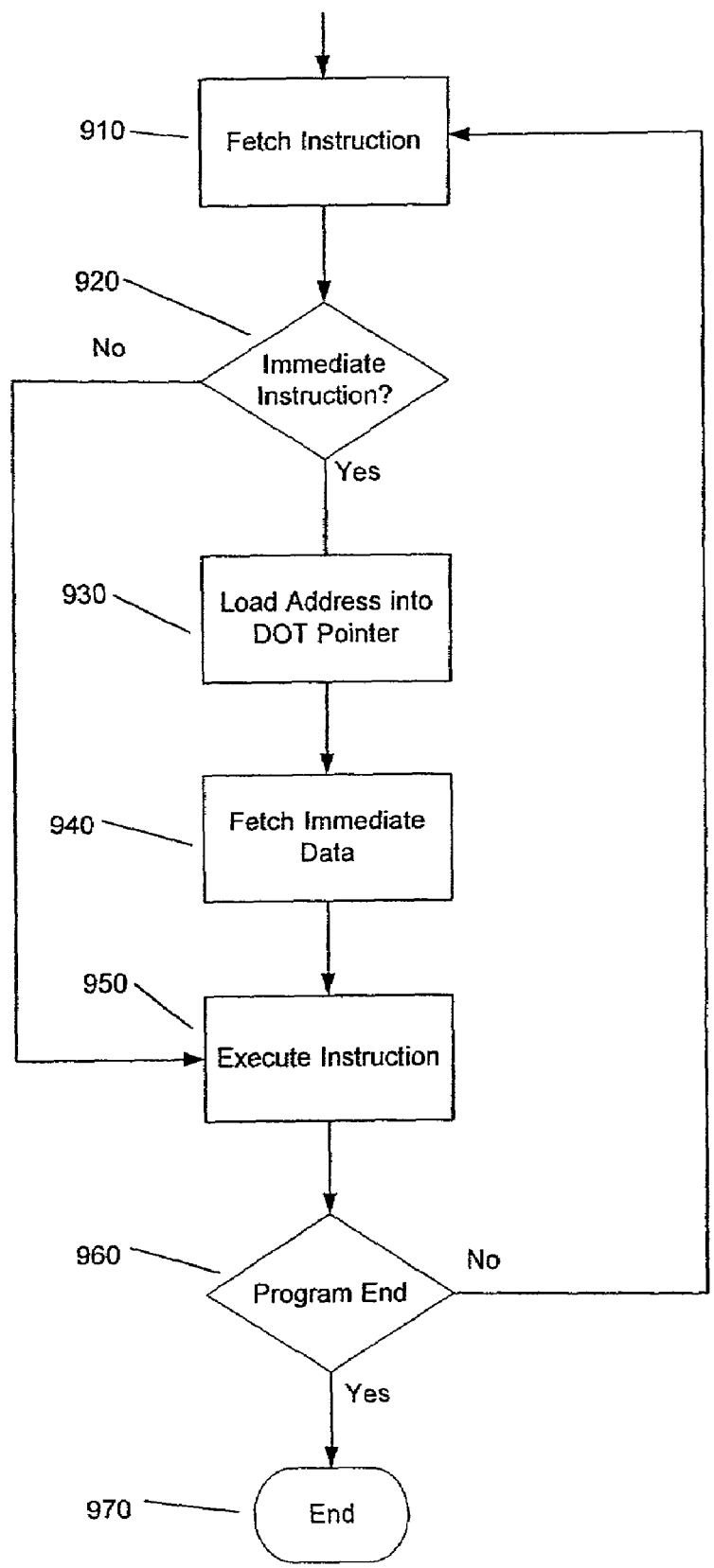
FIG. 9 shows a process for operating a processor in accordance with one embodiment of the invention.

FIG. 9 shows a process for operating a processor in accordance with one embodiment of the invention. The processor fetches an instruction at step 910. For example, at the beginning of program execution, the program counter is reset to 0 to point to the first instruction. The processor fetches the instruction to which the program counter points. At step 920, the processor determines whether the instruction is an immediate instruction or not. If it is not an immediate instruction, the processor proceeds to step 950 for instruction execution. If the instruction is an immediate instruction, the addressing information stored in the operand field is loaded into a DT pointer at step 930. At step 940, the processor retrieves the immediate data in the DT at the address provided by the DT pointer and executes the instruction at step 950. At step 960, the processor determines if the program is completed. If the program is not completed, the next instruction is fetched at step 910. The process continues until all instructions have been executed, terminating the program at step 970.

Figure 10:
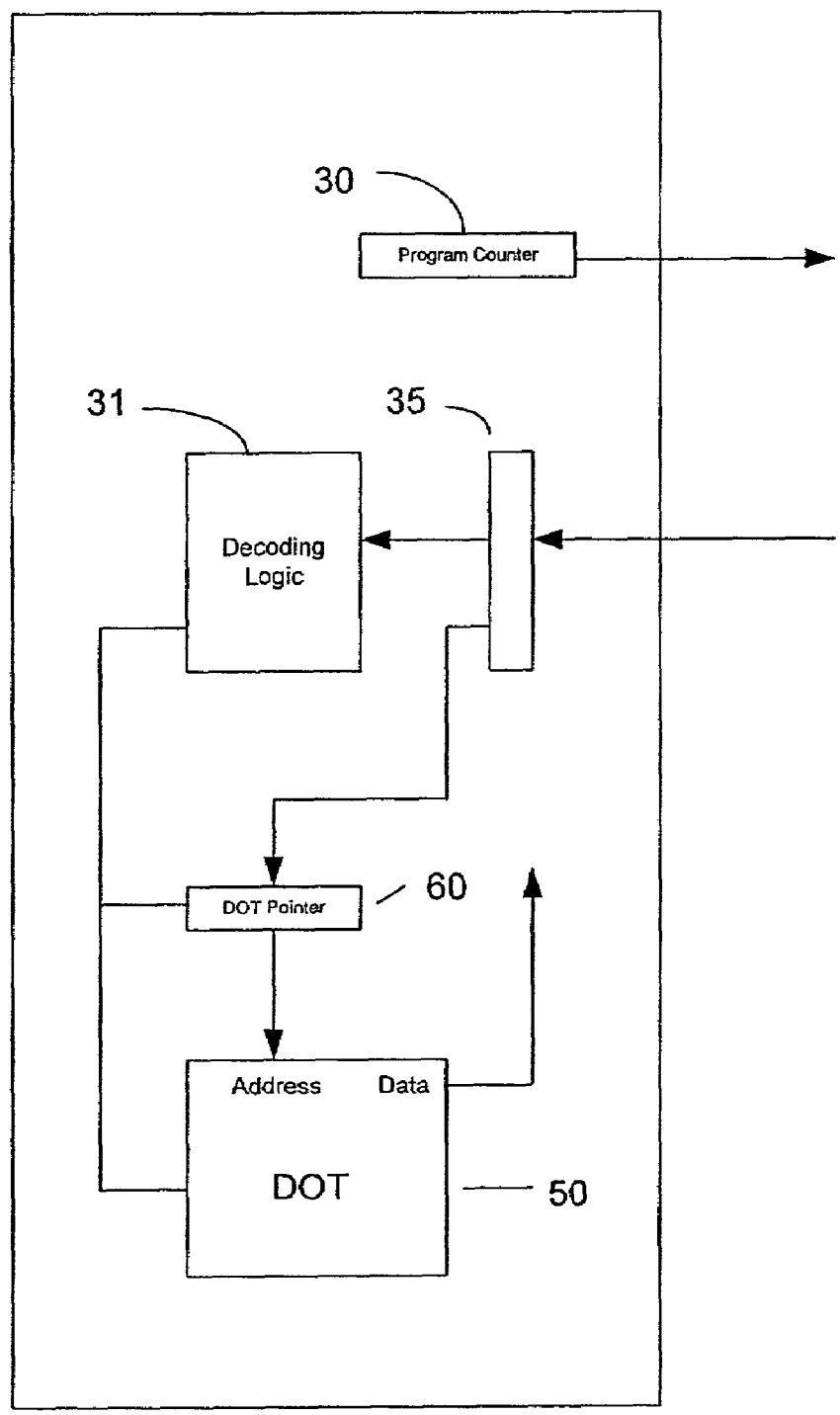
FIG. 10 shows a processor in accordance with one embodiment of the invention.

FIG. 10 shows a processor 10 in accordance with one embodiment of the invention. The processor can comprise a Von-Neuman or Harvard architecture. Other processor architectures are also useful. As shown, the processor comprises a program counter 30. The program counter is coupled to the memory (not shown) which stores the program. The program pointer points to the instruction that is to be fetched for execution. The instruction is fetched from memory and stored in the instruction register (IR) 35. An instruction decoder (ID) 31 decodes the instruction in the IR. If the ID determines that it is an immediate instruction, it activates a DT pointer 60 and a DT 50, causing the addressing information stored in the operand field of the immediate instruction word to be loaded into the DT pointer. The immediate data at the address contained in the DT pointer is made available to the processor for executing the immediate instruction. Alternatively, the addressing information can be used directly to access the DT, avoiding the need of a DT pointer.

In another embodiment of the invention, the coding uses relative addressing information. The relative addressing information comprises an offset that is used to address the immediate data in the DT. In one embodiment, the offset is with respect to the DT address of the immediate data from the previously executed immediate instruction. Employing the use of relative addressing advantageously reduces the number of bits needed to address the DT, particular for applications with a very large number of DT entries.

In accordance with one embodiment of the invention, the DT pointer is reset to a value that points to the first entry in the DT at the end of program execution or prior to the commencement of program execution. For example, the DT pointer is reset to zero.

The offset modifies the DT pointer for addressing the DT. In one embodiment, the offset is added to the current value stored in the DT pointer. To accommodate branching in the program, a pre/post bit is provided to indicate whether a pre-offset or post-offset format is used. This results in an instruction coding in which the operand field of an immediate instruction word comprises the format (pre/post, #offset). In one embodiment, a pre/post bit having a value of 1 represents a pre-offset format, and a 0 value represents a post-offset format. In the pre-offset, the offset is added to the current value of the DT pointer (current value+offset) before retrieving the immediate data from the DT. After the immediate data is retrieved, the value in the DT is incremented to point to the DT address containing the immediate data of the next immediate instruction. For example, the DT printer is incremented by 1 (current value+offset+1). In the post-offset format, the current value of the DT pointer (current value) is used to retrieve immediate data from the DT. The DT pointer is incremented, for example, by 1 (current value+1) after the immediate data is retrieved to point to the immediate data of the next immediate instruction.

In accordance with one embodiment of the invention, the coding of the pre/post bit and offset value depends on whether the section is conditional or unconditional. For unconditional sections, the immediate instructions have a coding wherein the pre/post bit indicates that the offset is added after instruction execution (post) and the offset value (#offset) is 1. The term "unconditional sections" also refers to conditional sections which are viewed as unconditional sections within a subsection.

As for conditional sections, the last immediate instruction of a right subsection has a coding format in which the pre/post bit indicates that the offset is added after instruction execution and the offset value is equal to the number of immediate instructions on the left subsection+1. The first instruction of the left subsection has a coding in which the pre/post bit indicates that the offset is added before instruction execution (pre) and the offset value is equal to the number of immediate instructions in the right subsection. All other immediate instructions have pre/post bit equal to post and offset equal to 1. The last immediate instruction in the program is always coded to reset the DT pointer to zero (i.e., beginning of the DT). This can be done by setting the offset value to zero while the value of pre/post bit has no effect (don't care).

As described, the maximum value (m) of the offset within a program in the case where the right subsection is analyzed first is equal either to the maximum number of immediate instructions in a right outermost subsection or to the number of immediate instructions in the left outermost subsection+1, whichever is greater. The number of bits needed to code the offset in the immediate instructions is equal to $\lceil \log_2(m+1) \rceil$. The total number of bits needed in the operand field to code an immediate instruction is equal to $1+\lceil \log_2(m+2) \rceil$, where the additional bit is for the pre/post flag. In some cases, the coding may include an additional bit to explicitly instruct the processor that the current instruction is an immediate instruction. In most embedded applications, especially in data-intensive DSP, the value of m is relatively small, such as less than 8. For m=8, the number of operand bits required is at most 5 bits (4 for the offset, 1 for the pre/post). In the case where an immediate instruction is identified explicitly by the use of a bit, only an additional bit is needed. This can significantly reduce the number of bits needed in the operand field to handle immediate data and eliminate the need for instruction extensions, resulting in more efficient coding.

Figure 11:
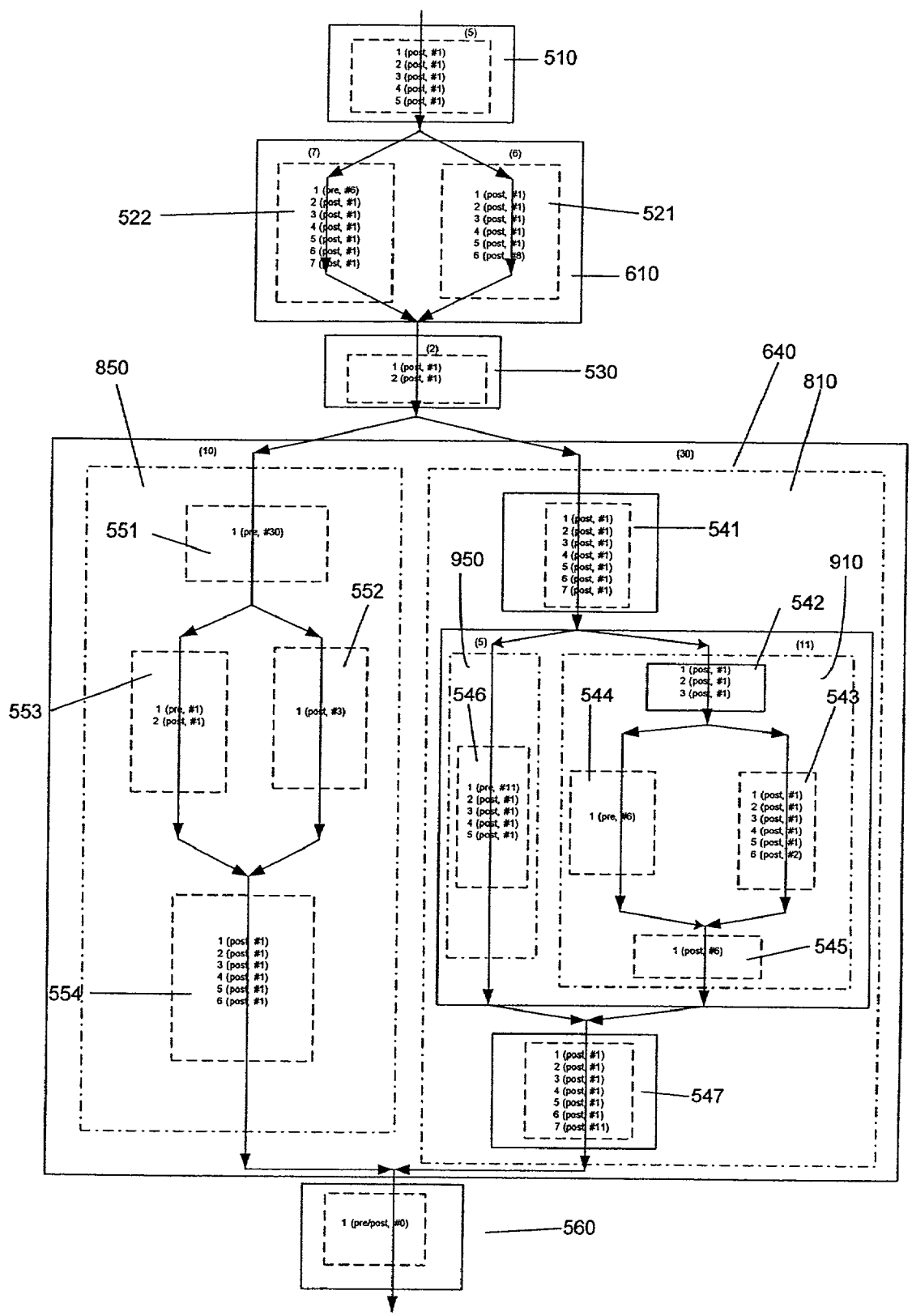
FIG. 11 illustrates the instruction coding in accordance with one embodiment of the invention.

FIG. 11 illustrates the coding in accordance with one embodiment of the invention. As shown, the program 501 is grouped into outermost sections 510, 610, 530, 640, and 560. A dashed box indicates an atomic unit or section. An immediate instruction within the section is represented by a number whose value indicates its program order within the section. The coding for the immediate instruction is enclosed in brackets. A post or pre indicates that the offset is added after or before instruction execution, and the value after # indicates the offset. An alternating short and long dashed box represents a right or left subsection. The number on top of each subsection reflects the number of immediate instructions within the subsection.

For unconditional outermost sections 510 and 530, the immediate instructions are coded (post, #1). The last immediate instruction of the program, which is located in outermost section 560, is coded (pre/post, #0) to reset the DT pointer to zero. Outermost section 610 is separated into right and left subsections. The right subsection comprises section 521 and the left subsection comprises section 522. The last immediate instruction in the right subsection is coded (post, #8) to provide an offset of 8 (7 instructions on the left subsection+1). The first instruction on the left section is coded (pre, #6).

As for outermost section 640, the right and left subsections 810 and 850 each comprises a plurality of sections. The sections within each subsection are recursively analyzed, grouping the sections into outermost sections and separating the outermost sections into right and left subsections, if necessary. For example, the right subsection 810 is grouped into outermost sections 541, 830, and 547. Outermost section 830 can further be separated into right and left subsections 110 and 150. The immediate instructions are coded as previously described.

Figure 12:
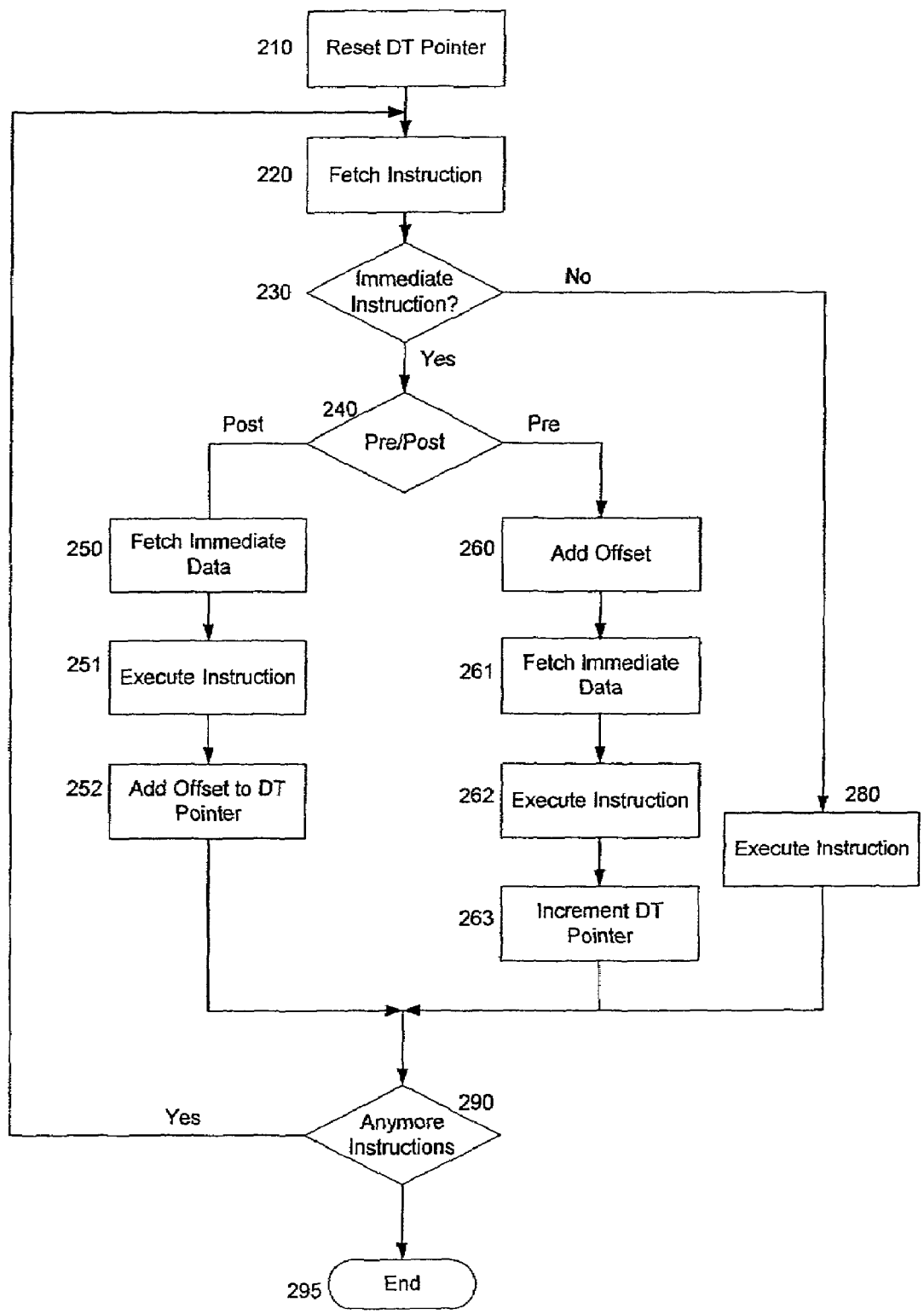
FIG. 12 shows a process for operating a processor in accordance with another embodiment of the invention.

FIG. 12 shows a process for operating a processor in accordance with another embodiment of the invention. At the beginning of program execution at step 210, the DT pointer is reset to zero to point to the first entry in the DT. The program counter is also reset to point to the first instruction. At step 220, the processor fetches the instruction to which the program counter points. At step 230, the processor determines whether the instruction is an immediate instruction or not. If it is not an immediate instruction, the processor proceeds to step 280 for instruction execution. If the instruction is an immediate instruction, the processor further determines if the offset information stored in the operand field is pre-format or post-format at step 240. Also, the processor can analyze the offset to see if it is equal to zero or not, indicating whether or not there are any more immediate instructions. A zero offset resets the DT pointer to zero. If the offset is post-format coded, the process proceeds to step 250. At step 250, the current value in the DT pointer is used to retrieve the immediate data in the DT. The instruction is executed at step 255. After instruction execution, the offset is added to the current value in the DT pointer and stored therein at step 252. If the offset is pre-format coded, the process proceeds to step 260. At step 260, the offset is added to the current value of the DT pointer and the new value is used to retrieve the immediate data in the DT at step 261. At step 262, the processor executes the immediate instruction. The DT pointer is then incremented by 1 at step 263. At step 290, the processor determines if there are anymore instructions. If there are, the next instruction is fetched at step 220. The process continues until all instructions have been executed, terminating the program at step 295.

Figure 13:
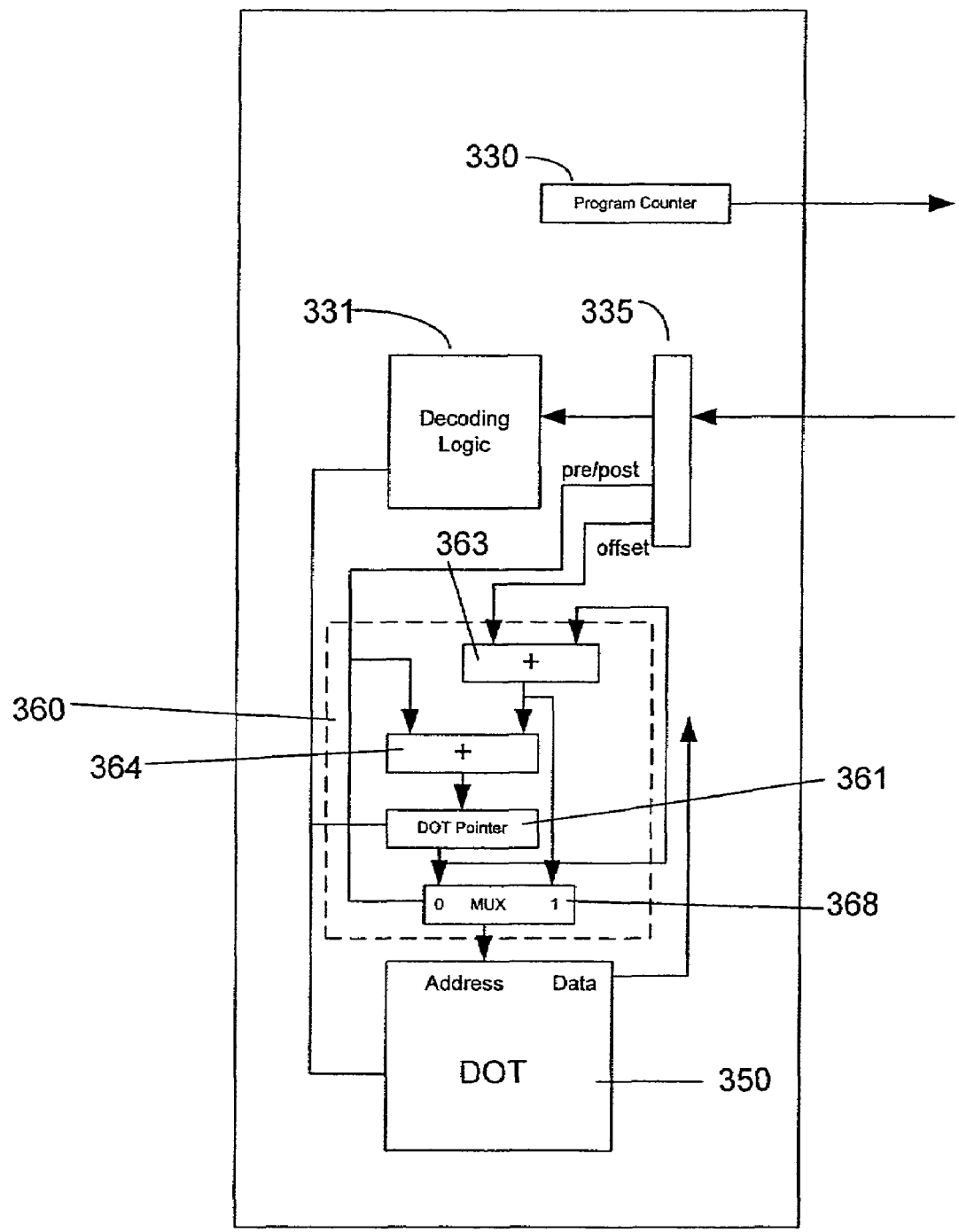
FIG. 13 shows a processor in accordance with another embodiment of the invention.

FIG. 13 shows a processor 310 in accordance with one embodiment of the invention. As shown, the processor comprises a program counter 330. The program counter is coupled to the memory (not shown) which stores the program. The program pointer points to an instruction. The instruction is fetched from memory and stored in an IR 335. An ID 331 decodes the instruction in the IR. If the ID determines that it is an immediate instruction, it activates a DT addressing unit 360 and DT 350. The DT addressing unit comprises a DT pointer 361, which receives the addressing information from the instruction. The addressing information in the DT pointer is used to fetch the immediate data from the DT for use by the processor.

The immediate instruction provides relative addressing information to identify the location of the immediate data in the DT. In one embodiment, the relative addressing information includes an offset and a pre/post bit. If the pre/post bit represents a post-offset, the DT addressing unit uses the current value in the DT pointer to address the DT to retrieve the immediate data. The offset is added to the current value of the DT pointer after the immediate data is fetched. If the pre/post bit represents a pre-offset, the DT addressing unit adds the offset to the current value of the DT pointer. The new value in the DT pointer is used to fetch the immediate data. After the immediate data is fetched, the DT is incremented by 1 to point to another address containing the immediate data of, for example, the next immediate instruction. As shown, a pre/post value of 1 represents pre-offset, and a pre/post value of 0 represents post-offset.

In one embodiment, the addressing unit comprises adders 363 and 364, the DT pointer, and a multiplexer 368. Adder 363 receives as inputs the offset value from the IR and the current value in the DT pointer. The output of adder 363 is coupled to adder 364. Also coupled to adder 364 is the pre/post bit. The output of adder 364 is coupled to the DT pointer, whose output is coupled to the multiplexer 368. The pre/post bit also serves as a select signal for the multiplexer.

In operation, adder 363 adds the offset to the current value in the DT pointer. The result of adder 363 is passed to both the adder 364 and to the multiplexer 368. A pre/post bit equal to 1 indicates a pre-offset addressing of the DT, causing the multiplexer to select the sum of the offset and current value of the DT pointer (current DT printer+offset) as the DT address containing the immediate data. Adder 364 then adds the results of adder 363 to the pre/post bit, which is 1. The result (offset+current DT pointer+1) is then loaded into the DT pointer for the next DT access.

A pre/post bit equal to 0 indicates a post-offset addressing of the DT. This causes the multiplexer to select the value of the current DT pointer to access the DT. After the immediate data is fetched from the DT, adder 363 adds the current DT value to the offset (current DT pointer+offset) whose result is then added by adder 364 to the pre/post bit, which is equal to 0. The result of adder 364 (current DT pointer+offset) is then loaded into the DT pointer to use for the next DT access.

In the case where the program does not include branching, the pre/post bit can be eliminated. Additionally, the instruction coding need only identify that the instruction is an immediate instruction. This is because the offset is always 1 if the immediate data is stored in their program order. By creating a scenario in which the offset is constant for all immediate instructions, the DT addressing unit can be configured to provide the offset. Thus, the need for offset information in the instruction coding can be avoided.

Figure 14:
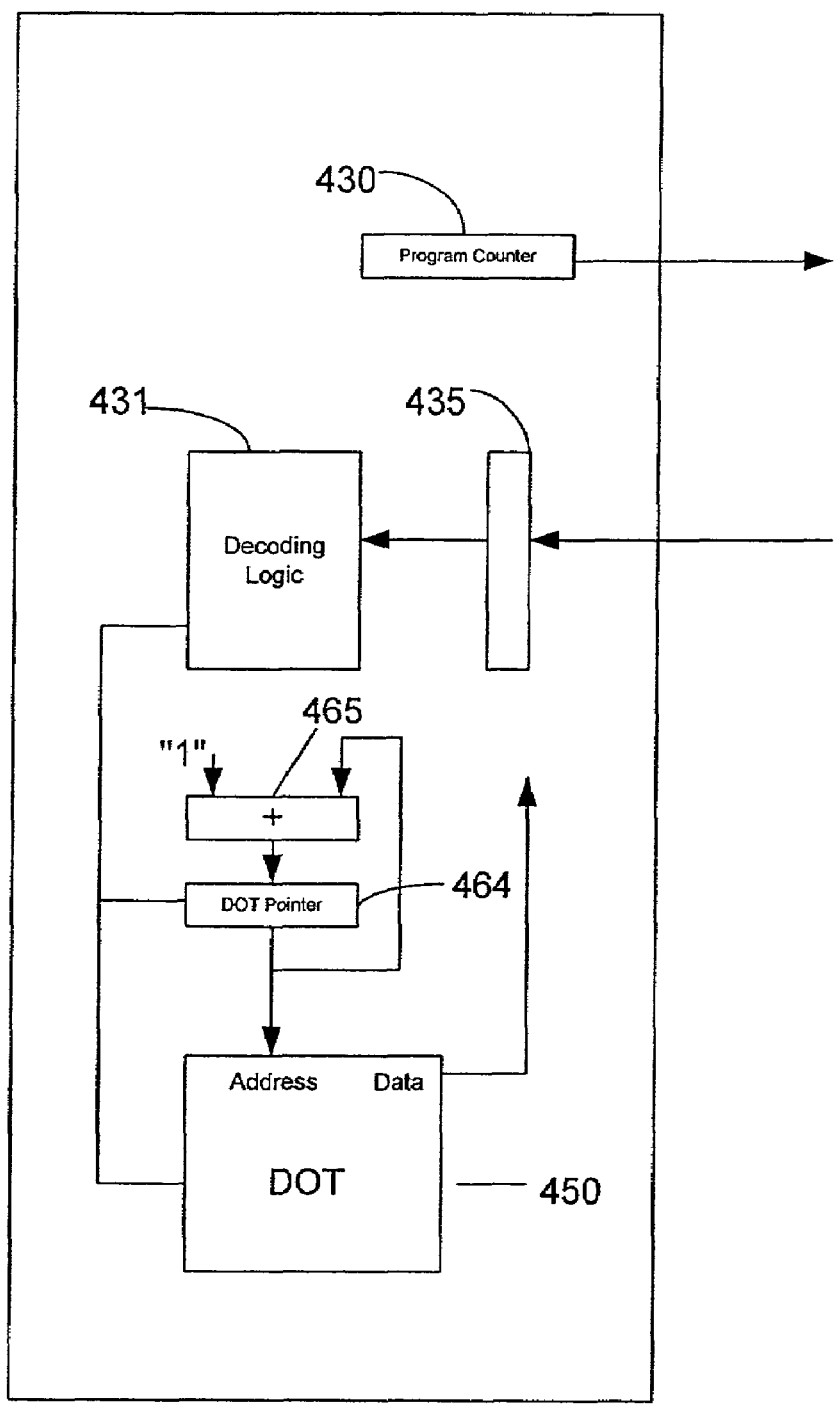
FIG. 14 shows a processor in accordance with yet another embodiment of the invention.

FIG. 14 shows an embodiment of a processor for handing coding without branching. As shown, the processor 410 comprises a program counter 430. The program counter is coupled to the memory (not shown) which stores the program. The program pointer points to an instruction that is to be executed. The instruction is fetched from memory and stored in the IR 435. An ID 431 decodes the instruction in the IR. If the ID determines that it is an immediate instruction, it activates a DT addressing unit 460 and a DT 450. The immediate data stored in the location referenced by a DT pointer 464 in the DT addressing unit is fetched for the processor's use. After the immediate data is fetched, the current value in the DT pointer is incremented by 1 using an adder 465 in the DT addressing unit.

While the invention has been particularly shown and described with reference to various embodiments, it will be recognized by those skilled in the art that modifications and changes may be made to the present invention without departing from its scope. The scope of the invention should therefore be determined not with reference to the above description but with reference to the appended claims along with their full scope of equivalents.

What is claimed is:

1. A processor comprising:
    instructions with at least one operand field, the instructions comprises immediate instructions having immediate data in the operand field;
    a data table for storing immediate data, wherein immediate data are stored in the data table in an order determined by a flow analysis, the data table enables immediate data to be separated from the instruction stream;
    a program counter for storing an instruction address of an instruction, wherein the processor fetches an instruction from the instruction address in the program counter during program execution;
    an instruction decoder for decoding the instruction fetched by the processor, wherein immediate data from the data table is provided to the processor if the instruction fetched is an immediate instruction;
    an instruction register coupled to the instruction decoder, the instruction register stores the instruction fetched by the processor during program execution and passes the instruction to the instruction decoder for decoding; and
    a data table addressing unit coupled to the data table and the instruction register, the instruction register passing relative addressing information contained in the instruction to the data table addressing unit when the decoder decodes the immediate instruction, the relative addressing information, which comprises an index and a format indicator, is used to provide an address of the immediate data in the data table,
    wherein the data addressing unit comprises a data table pointer containing a value,
        if the format indicator comprises a post-format, the value serves as the address and after the immediate data is provided to the processor, the index is added to the value to produce a new value in the data table pointer for a next immediate instruction,
        if the format indicator comprises a pre-format, the index is added to the value to produce the address to the immediate data and the address is incremented by 1 after the immediate data is provided to the processor to produce a new value in the data table pointer for the next immediate instruction,
    the format indicator comprises a binary bit having a logic 1 and logic 0 value, the logic 1 indicating one of pre-format or post-format and the logic 0 indicating other of pre-format or post-format,
    the data table addressing unit further comprising,
        a first adder comprising a first input coupled to the instruction register for receiving the index and a second input coupled to an output of the data table pointer for receiving the value contained therein,
        a second adder comprising a first input coupled to the instruction register for receiving the format indicator, a second input coupled to an output of the first adder, and an output coupled to the data table pointer, and
        a multiplexor comprising a first input coupled to an output of the data table pointer, a second input coupled to the output of the first adder, and a select input coupled to the instruction register for receiving the format indicator to select an multiplexor output from the first and second multiplexor inputs.

2. The processor of claim 1 wherein the data table addressing unit comprises an incrementor for incrementing the address after the immediate data is provided to produce a new address for a new immediate instruction.

3. The processor of claim 1 or 2 wherein the flow analysis comprises a static flow analysis, the static flow analysis to identifies immediate instructions within a program.

4. The processor of claim 3 wherein an immediate instruction comprises addressing information to enable the processor to retrieve a corresponding immediate data to the immediate instruction.

5. The processor of claim 4 wherein the addressing information comprises absolute addressing information.

6. The processor of claim 4 wherein the addressing information comprises relative addressing information.

7. A processor comprising:
a data table for storing immediate data of immediate instructions;
a program counter for storing an instruction address of an instruction, wherein the processor fetches the instruction from the instruction address in the program counter during program execution; and
an instruction decoder for decoding the instruction fetched by the processor, wherein immediate data from the data table is provided to the processor if the instruction is an immediate instruction;
an instruction register coupled to the instruction decoder, the instruction register stores the instruction fetched by the processor during program execution and passes the instruction to the instruction decoder for decoding;
a data table addressing unit comprising a data table pointer containing a value, the data table is coupled to the data table and instruction register, the instruction register passing relative addressing information contained in the instruction to the data table addressing unit when the decoder decodes the immediate instruction, the relative addressing information, which comprises an index and a format indicator, is used to provide an address of the immediate data in the data table, wherein the format indicator comprises a binary bit having a logic 1 and logic 0 value, the logic 1 indicating one of a pre-format or a post-format and the logic 0 indicating other of the pre-format or post-format;
if the format indicator indicates the post-format, the value serves as the address and after the immediate data is provided to the processor, the index is added to the value to produce a new value in the data table pointer for a next immediate instruction and if the format indicator indicates the pre-format, the index is added to the value to produce the address to the immediate data and the address is incremented by 1 after the immediate data is provided to the processor to produce a new value in the data table pointer for the next immediate instruction; and
wherein the addressing unit comprises
a first adder comprising a first input coupled to the instruction register for receiving the index and a second input coupled to an output of the data table pointer for receiving the value contained therein,
a second adder comprising a first input coupled to the instruction register for receiving the format indicator, a second input coupled to an output of the first adder, and an output coupled to the data table pointer, and
a multiplexor comprising a first input coupled to an output of the data table pointer, a second input coupled to the output of the first adder, and a select input coupled to the instruction register for receiving the format indicator to select an multiplexor output from the first and second multiplexor inputs.

8. A processor comprising:
a data table for storing immediate data of immediate instructions;
a program counter for storing an instruction address of an instruction, wherein the processor fetches the instruction from the instruction address in the program counter during program execution; and
an instruction decoder for decoding the instruction fetched by the processor, wherein immediate data from the data table is provided to the processor if the instruction is an immediate instruction;
an instruction register coupled to the instruction decoder, the instruction register stores the instruction fetched by the processor during program execution and passes the instruction to the instruction decoder for decoding;
a data table addressing unit comprising a data table pointer having a value, the data table addressing unit receives relative addressing information for decoded immediate instructions, the relative addressing information, which comprises an index and a format indicator, is used to provide an address of the immediate data in the data table;
if the format indicator indicates a post-format, the value serves as the address and after the immediate data is provided to the processor, the index is added to the value to produce a new value in the data table pointer for a next immediate instruction and if the format indicator indicates a pre-format, the index is added to the value to produce the address to the immediate data and the address is incremented by 1 after the immediate data is provided to the processor to produce a new value in the data table pointer for the next immediate instruction; and
wherein the addressing unit comprises
a first adder comprising a first input coupled to the instruction register for receiving the offset and a second input coupled to an output of the data table pointer for receiving the value contained therein,
a second adder comprising a first input coupled to the instruction register for receiving the format indicator, a second input coupled to an output of the first adder, and an output coupled to the data table pointer, and
a multiplexor comprising a first input coupled to an output of the data table pointer, a second input coupled to the output of the first adder, and a select input coupled to the instruction register for receiving the format indicator to select an multiplexor output from the first and second multiplexor inputs.

* * * * *